United States Patent [19]

Neumann

[11] 4,360,128

[45] Nov. 23, 1982

[54] BEVERAGE DISPENSER HAVING TIMED OPERATING PERIOD RESPONSIVE TO RESERVOIR QUANTITY

[75] Inventor: Charles G. Neumann, Palatine, Ill.

[73] Assignee: Reynolds Products Inc., Schaumburg, Ill.

[21] Appl. No.: 173,271

[22] Filed: Jul. 29, 1980

[51] Int. Cl.³ ............... A47J 31/46; G04C 23/38
[52] U.S. Cl. ............................ 222/26; 99/281; 219/333; 219/433; 219/518; 222/64; 222/641; 222/146 HE; 340/618
[58] Field of Search ............... 222/23, 25, 58, 26, 222/64, 65, 66, 70, 146 HE; 99/280, 281, 285, 288; 219/214, 322, 333, 433, 518; 364/478, 479, 567, 568, 569; 414/21; 340/612, 613, 614, 618, 620, 623, 624, 625

[56] References Cited

U.S. PATENT DOCUMENTS

| | | | |
|---|---|---|---|
| 1,719,498 | 7/1929 | Bernard | 99/281 |
| 1,769,639 | 7/1930 | Gustafson | 340/613 |
| 2,836,672 | 5/1958 | Craven, Jr. et al. | 340/613 X |
| 2,855,476 | 10/1958 | Garrard | 222/70 X |
| 2,935,010 | 5/1960 | Arnett et al. | 222/70 X |
| 3,126,812 | 3/1964 | Nau | 222/66 X |
| 3,235,922 | 2/1966 | Kaji | 222/70 X |
| 3,481,509 | 12/1969 | Marhauer | 222/58 X |
| 3,665,156 | 5/1972 | Lee | 219/333 |
| 3,906,475 | 9/1975 | Rubin et al. | 222/23 X |
| 4,149,412 | 4/1979 | Fish | 340/612 X |
| 4,164,644 | 8/1979 | Remsnyder et al. | 219/518 X |
| 4,265,371 | 5/1981 | Desai et al. | 222/70 |

Primary Examiner—Robert B. Reeves
Assistant Examiner—Edward M. Wacyra
Attorney, Agent, or Firm—Shenier & O'Connor

[57] ABSTRACT

A beverage dispenser in which a sensor provides an output corresponding to the level of the beverage in a storage reservoir from which the beverage is dispensed. In response to user actuation a dispensing valve is enabled for such a time interval, determined in accordance with the output of the sensor, as to compensate for variations in flow rate due to variations in the beverage level in the reservoir. The level sensor output is also used to control a level-indicating display and to disable the reservoir heater when the reservoir is empty. Preferably the sensor is a strain gauge adhered to the surface of a relatively thin resilient beam which supports a portion of the reservoir.

9 Claims, 5 Drawing Figures

| I | TIME (I) | | |
|---|---|---|---|
| | 5 OZ. | 6 OZ. | 10 OZ. |
| 1 | 2.8 | 3.3 | 5.6 |
| 2 | 2.8 | 3.3 | 5.6 |
| 3 | 2.9 | 3.4 | 5.8 |
| 4 | 3.1 | 3.65 | 6.2 |
| 5 | 3.3 | 3.9 | 6.6 |
| 6 | 3.6 | 4.3 | 7.2 |
| 7 | 3.9 | 4.65 | 7.9 |
| 8 | 4.3 | 5.1 | 8.6 |

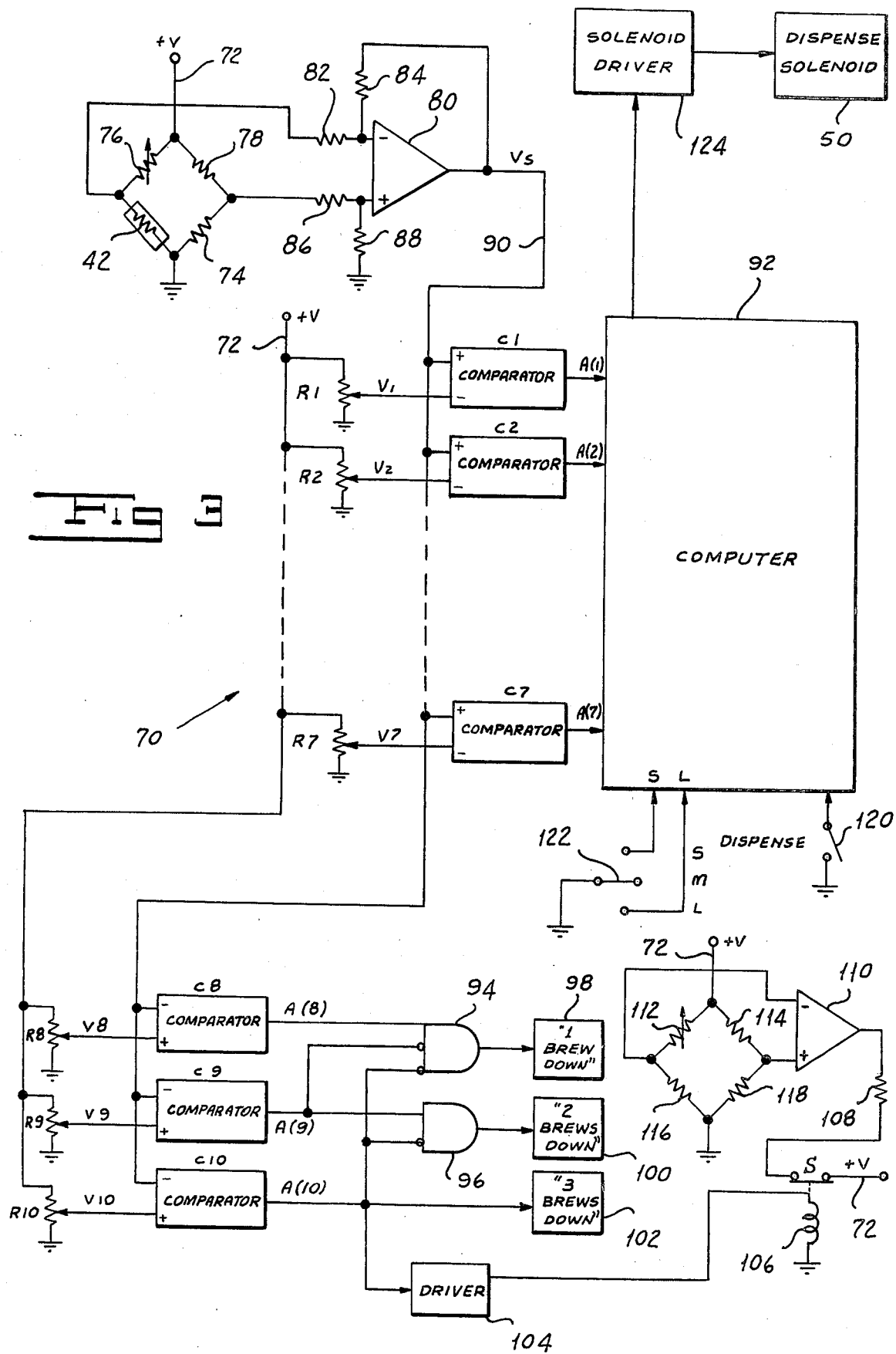

BEVERAGE DISPENSER HAVING TIMED OPERATING PERIOD RESPONSIVE TO RESERVOIR QUANTITY

BACKGROUND OF THE INVENTION

Apparatus for dispensing coffee or other beverage in response to the deposit of a coin or the actuation of a switch are well known in the art. In one type of such apparatus, a storage pan or reservoir is used to hold the previously prepared beverage prior to dispensing and to dispense the beverage from the storage pan through a controllable valve.

Various expedients have been employed in the prior art to control the amount of beverage delivered to a user. In some vending machines, the dispense valve is opened by actuation of a push-button switch that becomes operable if a coin is deposited. The valve does not close until the button is released. If a customer is able to position a second cup with one hand after the first cup is filled while keeping the button depressed with the other hand, he can obtain two or more cups for the price of only one. In other systems, the dispense valve is energized for a fixed time interval to dispense the desired amount of beverage. This method is highly unsatisfactory, however, since the flow rate is dependent on the pressure head from the reservoir, which varies directly with the level of beverage in the reservoir.

Still other systems employ a positive displacement technique in which a first valve is actuated to fill a chamber with beverage from the reservoir and a second valve then actuated to fill the cup from the chamber. While these systems insure the dispensing of a controlled amount of beverage irrespective of the level in the reservoir, they do not permit ready adjustment to dispense different amounts of beverage.

SUMMARY OF THE INVENTION

One of the objects of my invention is to provide a beverage dispenser which accurately dispenses a controlled amount of a beverage.

Another object of my invention is to provide a beverage merchandiser which prevents multiple dispensations of a beverage when the cost of only a single delivery has been deposited.

Yet another object of my invention is to provide a beverage dispenser in which the amount of beverage dispensed does not depend on the level of the beverage in a storage reservoir.

Still another object of my invention is to provide a beverage dispenser which is readily adjustable to dispense different desired amounts of beverage.

Another object of my invention is to provide a beverage dispenser in which the number of moving parts is minimized.

Other and further objects of my invention will be apparent from the following description.

In general, my invention contemplates a beverage dispenser in which a sensor provides an output corresponding to the level of the beverage in a storage reservoir from which the beverage is dispensed. In response to user actuation a dispensing valve is enabled for such a time interval, determined in accordance with the output of the sensor, as to compensate for variations in flow rate due to variations in the beverage level in the reservoir. Preferably, the sensor is a strain gauge adhered to the surface of a relatively thin resilient beam which supports a portion of the reservoir.

My invention further contemplates apparatus in which the level sensor output is used to control a level-indicating display and to disable the reservoir heater when the reservoir is empty.

BRIEF DESCRIPTION OF THE DRAWINGS

In the accompanying drawings which form part of the instant specification and which are to be read in conjunction therewith and in which like reference numerals indicate like parts in the various views:

FIG. 3 is a schematic diagram of a control circuit for the beverage dispenser shown in FIG. 1.

DETAILED DESCRIPTION OF THE PREFERRED EMBODIMENT

Figure 1:
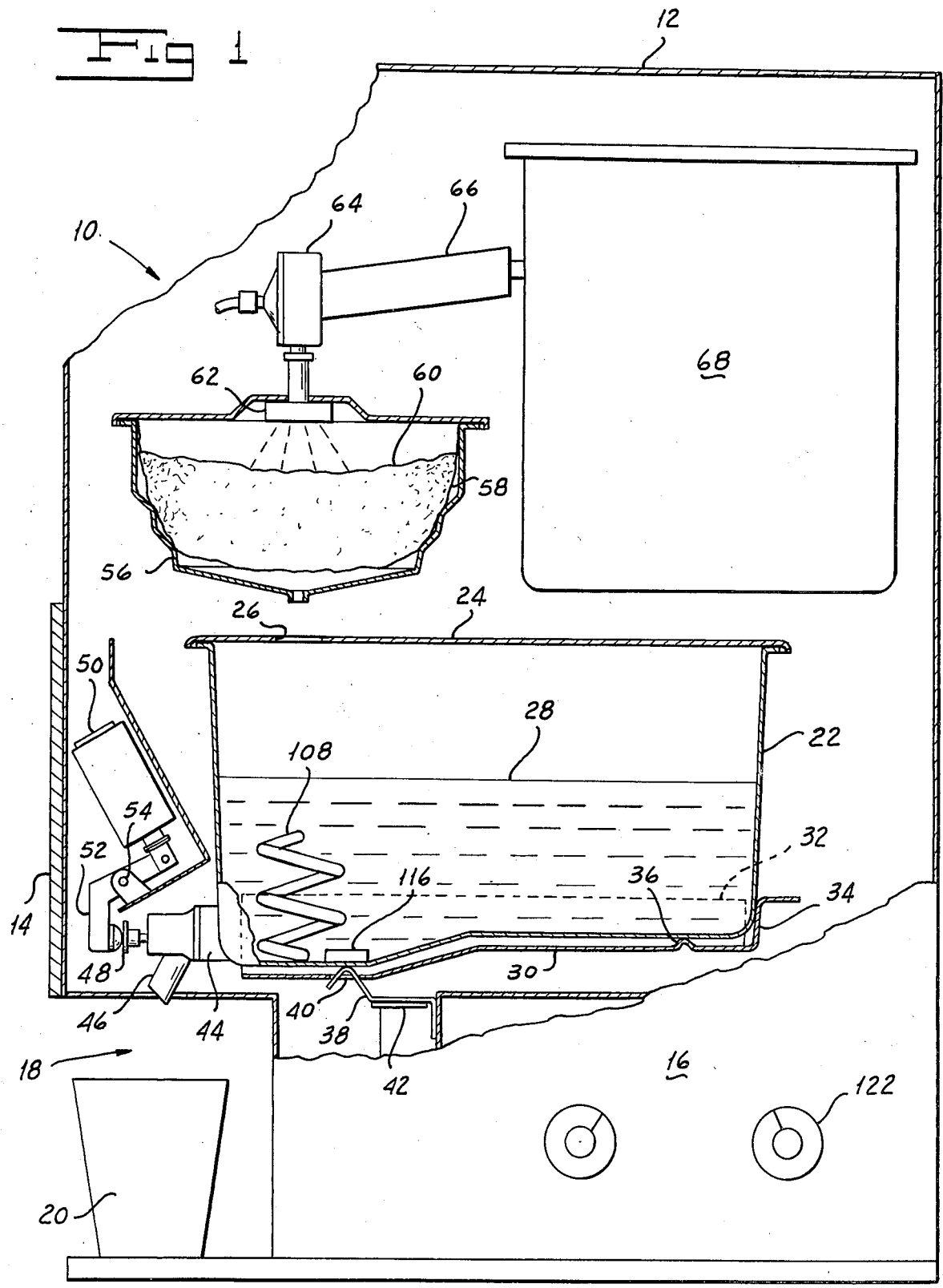
FIG. 1 is a fragmentary side elevation of my beverage dispenser, with parts shown in section.

Referring now to the drawings, my beverage dispenser, indicated generally by the reference numeral 10, is enclosed by a housing 12 having a front display panel 14 and a side control panel 16. The housing 12 is formed with a recess 18 at the lower end of the front panel in which a cup 20 may be placed to receive a dispensed beverage.

A storage pan 22 holds a supply of a beverage 28 such as coffee supplied to the pan through an aperture 26 formed in a top cover 24. Storage pan 22 rests on a transversely extending ridge 36 formed in a support 30 near the rear end thereof. Side flanges 32 and a rear flange 34 on the support 30 confine the storage pan 22 laterally and rearwardly without bearing any of the weight of the pan 22. The front end of the storage pan 22 rests on the inverted-V-shaped front end of a resilient metal strip or arm 38 secured at the rear end thereof to a portion of the housing 12 and extending through an aperture 40 formed in the support 30. A strain gauge 42 secured to the lower surface of the resilient arm 38 with its gauge axis running fore and aft relative to the dispenser 10 senses the compressional, or negative, strain in the lower surface of the arm 38 resulting from the weight of the storage pan 22 and the beverage 28 contained therein.

The cup 20 receives the beverage 28 through a dispensing valve 44 located at the lower front end of the storage pan 22. Actuation of a solenoid 50 causes lever arm 52 to rotate about its pivot 54, pressing the actuator button 48 of the valve 44 inwardly to allow the beverage 28 to flow through the spout 46 and into cup 20.

The beverage 28 may be coffee which is supplied to the storage pan 22 from a brew basket 56 disposed above the aperture 26 in the top cover 24. As is known in the art, brew basket 56 receives a replaceable filter cup 58 partially filled with ground coffee 60 and receives hot water from a spray discharge head 62 disposed at the top of the brew basket. A spray discharge valve 64 controls the flow of hot water to the brew basket from a hot water tank 68 through a discharge line 66. While the brew basket 56, hot water tank 68 and associated elements do not per se form a part of my invention, a detailed description of an automatic beverage brewer containing these elements may be found in U.S. Pat. No. 3,443,508, issued to D. S. Reynolds et al.

In FIG. 3, I show the control circuit, indicated generally by the reference numeral 70, for my beverage dispenser. I connect the electrical terminals of the strain gauge 42 respectively to ground and to one terminal of an adjustable resistor 76, the other terminal of which I connect to a line 72 leading from a source of positive DC potential. Gauge 42 and resistor 76 make up two legs of a bridge, the other two legs of which are formed by resistors 74 and 78. Respective resistors 82 and 86 connect the output terminals of the bridge to the inverting and noninverting input terminals of a high-gain operational amplifier 80. Respective resistors 84 and 88 couple the inverting and noninverting inputs of amplifier 80 to the amplifier output and to ground respectively.

Amplifier 80 provides an output $v_s$ which is proportional to the difference between the potentials across the strain gauge 42 and the resistor 74. Resistor 76 is so adjusted that amplifier 80 provides a zero output when the pan 22 is empty. As more beverage 28 is supplied to the pan 22, the increased pressure on the resilient strip 38 causes an increased compressive, or negative, strain on the lower surface of the strip, in turn decreasing the electrical resistance of the strain gauge 42. As a result, strain gauge 42 supplies a reduced potential to the inverting input of amplifier 80, thereby resulting in an increasingly positive amplifier output.

I convert the output of amplifier 80, which appears as an analog signal on line 90, to a series of quantized signals indicating in a discrete fashion the extent to which the pan 22 is filled. To this end, I compare the signal $v_s$ with a plurality of reference potentials $v_1$ to $v_{10}$ derived from respective potentiometers R1 to R10 coupled between the DC voltage line 72 and ground. Respective comparators C1 to C10 each receive one input from line 90 and the other input as one of the comparison potentials $v_1$ to $v_{10}$. Comparators C1 to C7 each provide a 1, or high, output whenever the potential $v_s$ on line 90 exceeds the comparison potential but provide a zero, or low, output otherwise. Comparators C8 to C10 on the other hand each provide a low output when $v_s$ exceeds the comparison potential and a high output otherwise.

Potentiometers R1 to R7 are set to provide potentials $v_1$ to $v_7$ spaced in approximately equal steps between a potential $v_1$ corresponding to a nearly full storage pan and a potential $v_7$ corresponding to a nearly empty storage pan. Thus, when storage pan 22 is filled to its capacity of approximately 30 cups, none of the outputs of the comparators C1 through C7 are low. On the other hand, when the storage pan 22 is nearly empty, all of the comparator outputs are low. Intermediate levels of beverage 28 in the storage pan 22 result in an intermediate number of the comparators C1 to C7 providing low outputs.

Potentiometers R8, R9 and R10 are set to provide potentials corresponding to the output of amplifier 80 when the storage pan 22 is two-thirds full, one-third full and nearly empty, respectively. Thus, when the storage pan 22 is two-thirds full or more, that is, containing 20 or more cups of coffee, the potential $v_s$ exceeds each of the potentials $v_8$, $v_9$ and $v_{10}$. As a result, each of the comparators C8, C9 and C10 provides a zero output. When the level of the beverage 28 in the storage pan 22 drops below the level corresponding to two-thirds full, $v_8$ then exceeds $v_s$, resulting in a high output from comparator C8. An AND circuit 94 responsive to the output of comparator C8 then provides a high output to energize an indicator light 98 on the front panel of the dispenser 10 indicating that the level of the beverage 28 is 10 cups, or one brew, down from its initial level.

When the level of the beverage 28 drops below one-third full, or 10 cups, $v_9$ also exceeds $v_s$, resulting in a 1 or high output from comparator C9 as well as from C8. The high output of comparator C9 is applied to an inverting input of AND circuit 94 to disable the "one brew down" indicator lamp 98. At the same time, the output of comparator C9 is fed to another AND circuit 96, the output of which energizes a "two brews down" indicator lamp 100 on the front panel 14 below indicator lamp 98.

When, eventually, the level of the beverage 28 in storage pan 22 drops to a near empty level, all three potentials $v_8$, $v_9$ and $v_{10}$ exceed the strain gauge potential $v_s$. As a result, all three comparators C8, C9 and C10 provide zero or low outputs. The zero output of comparator C10 feeds inverting inputs of AND circuits 94 and 96 to disable respective indicator lights 98 and 100 and, in addition, energizes a "three brews down" indicator lamp 102 disposed on the front panel 14 below lamps 98 and 100.

In the normal operation of the dispenser 10, the temperature of the beverage 28 in the storage pan 22 is controlled by a resistive heating coil 108 disposed in the pan 22 by a thermistor 116 also disposed in the pan 22. Thermistor 116 is coupled in a bridge circuit between ground and one terminal of an adjustable resistor 112, the other terminal of which is coupled to DC voltage line 72. Resistors 114 and 118 form the other legs of the bridge. The bridge output terminals are coupled respectively to the inverting and to the noninverting inputs of a differential amplifier 110. I couple the heating element 108 between the output of amplifier 110 and one terminal of a normally closed relay-controlled switch S, the other terminal of which I couple to line 72.

In the normal operation of the heating control circuit, any increase in the temperature of the beverage 28 will result in a corresponding decrease in the resistance of thermistor 116, thereby resulting in a lower potential being applied to the inverting input of amplifier 110. As a result, the output of amplifier 110 rises, causing the potential applied to the heating coil 108 to drop, thereby leading eventually to a suitably lower temperature of the beverage 28. Variable resistor 112 is set at a suitable level to establish a proper temperature of the beverage 28 in the pan 22.

In response to the change of the output of comparator C10 to zero when the beverage reaches a near empty level in the pan 22, a driver circuit 104 energizes a relay 106, opening the switch S and thereby disabling the heating element 108.

Figure 4:
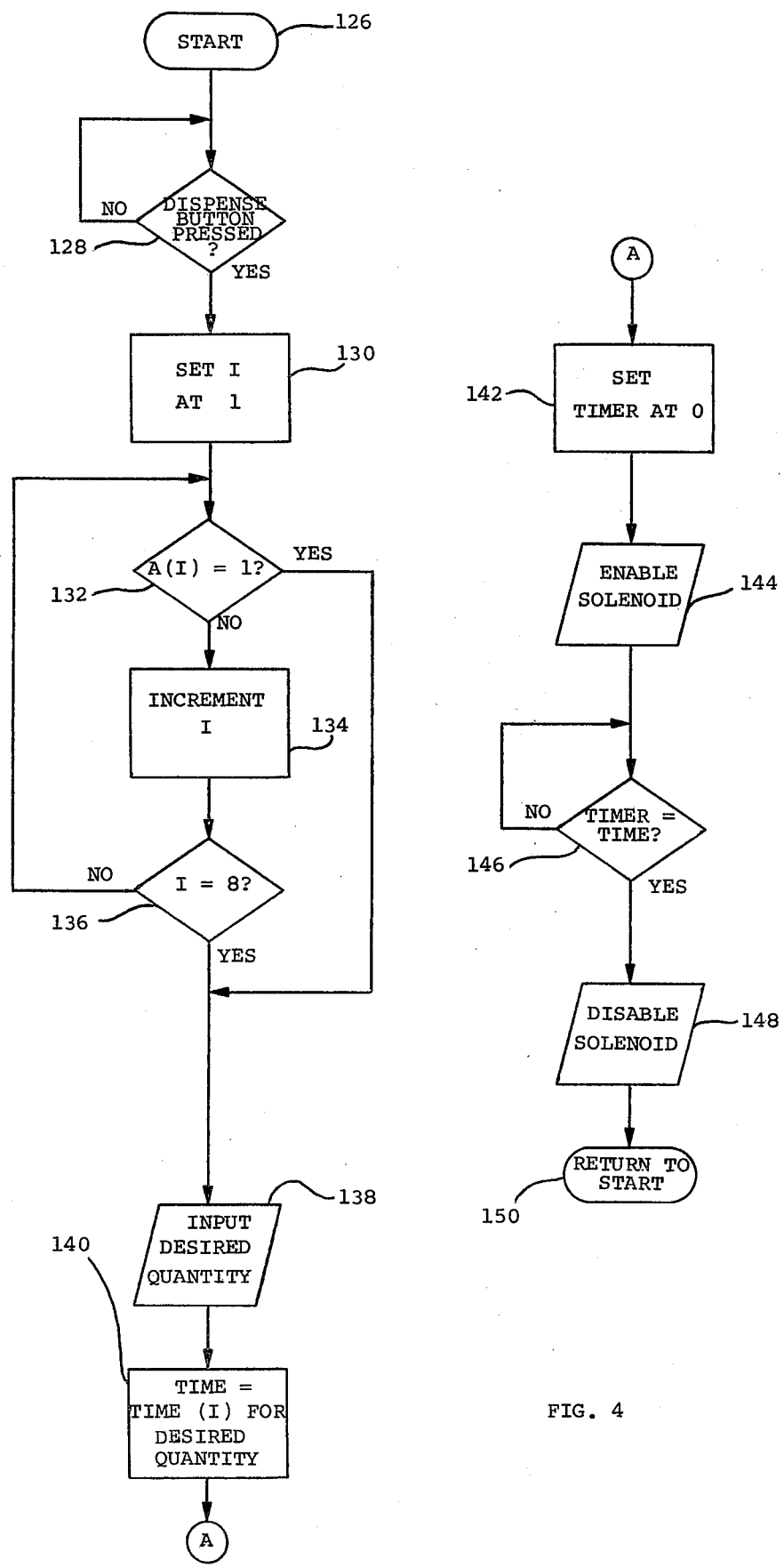
FIG. 4 is a flow chart illustrating a program which may be followed by the microcomputer of the control circuit shown in FIG. 4.

I couple the outputs of comparators C1 to C7 to a microcomputer 92 such as an Intel 8048, sold by the Intel Corporation of Santa Clara, Calif., and described in the Intel user's manual entitled "MCS-48 Family of Single Chip Microcomputers" (1978). FIG. 4 is a flowchart illustrating a program which may be followed by the computer 92 in generating suitable time bases for controlling the dispensing of beverage 28 from the storage pan 22. After the program starts (block 126), it waits (block 128) for a normally open dispense button 120, coupled between a normally high input to computer 92 and ground and mounted on the front panel 14, to be closed.

After the dispense button 120 is pushed, the program sets an index I at 1 (block 130) and interrogates the corresponding comparator to determine whether the output of that comparator is one, indicating that the storage pan 22 is filled at least to the level set by the corresponding one of potentiometers R1 to R7 (block 132). If the comparator output is 1, the program leaves the loop. Otherwise, the program increments the index I by 1 (block 134) and asks (block 136) whether the index has now reached the number 8, indicating that there are no more comparators to be checked. If the index I is still 7 or less, the program returns to block 132 to interrogate the next comparator to determine whether its output is 1. The program continues along the loop comprising blocks 132 to 136 until either a comparator with a 1 output is found or the index I reaches 8. Thus, when the program leaves the loop the index I will be set at a number between 1 and 8 corresponding to the "zone" to which the storage pan 22 is filled.

Figures 2, 5:
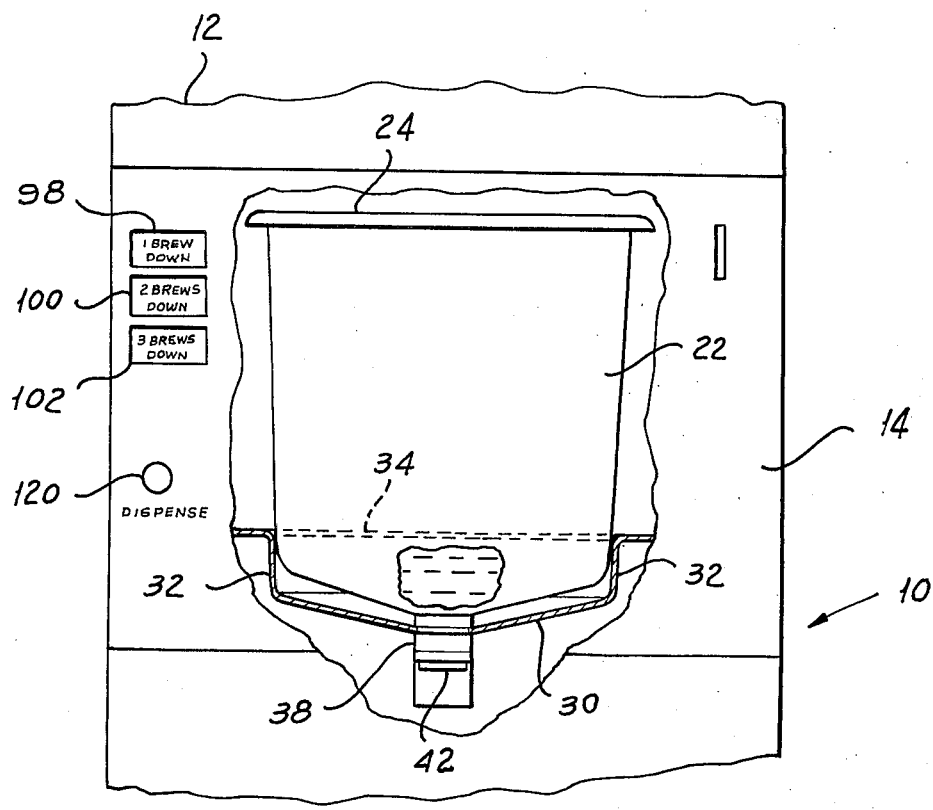
FIG. 2 is a fragmentary front elevation of the beverage dispenser shown in FIG. 1, illustrating the front display panel and strain-gauge sensor associated with the beverage storage pan.
FIG. 5 is a table of the various time bases associated with various desired amounts of beverage and sensed levels of beverage in the storage pan of the dispenser shown in FIG. 1.

Next, the program interrogates the outputs of a three-position selector switch 122 which may be set to select a small (5 oz.), medium (6 oz.) or large (10 oz.) quantity of beverage to be dispensed. Switch 122, which may be mounted on the side panel 16, grounds a normally high first input to computer 92 if moved to the "small" position and grounds a second normally high input to computer 92 if moved to the "large" position. Otherwise, both outputs remain high. After determining the desired quantity of beverage to be dispensed, the program selects a suitable time base (block 140) from an internally stored array of time bases shown in tabular form in FIG. 5. As is apparent from the table, the time base selected depends both on the value of I, indicating the present level of the tank 22, and the amount of beverage to be dispensed.

The program next sets a timer (not shown) internal to computer 92 to zero to mark the beginning of the dispense sequence, and thereafter provides a suitable signal to a solenoid driver 124 to energize the dispense solenoid 50 (block 144). Energization of solenoid 50 causes the beverage 28 to be dispensed through the spout 46 in the manner described above. When the elapsed time as measured by the timer output equals the previously selected time base (block 146), the program disables (block 148) the solenoid 50, thereby terminating the dispensing sequence. Thereafter, the program returns (block 150) to the starting block 126 to await the subsequent actuation of the dispense button 120.

It will be seen that I have accomplished the objects of my invention. My beverage dispenser dispenses a controlled amount of a beverage and is readily adjustable to dispense different desired amounts of beverage. Further, the amount of the beverage dispensed does not depend on the level of the beverage in the storage reservoir. Finally, my beverage dispenser resists unauthorized attempts to obtain multiple dispensations of a beverage.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Beverage dispensing apparatus including in combination a reservoir adapted to receive a beverage to be dispensed, means for sensing the amount of said beverage in said reservoir, means responsive to user actuation for dispensing said beverage from said reservoir, and means responsive to said sensing means for controlling the period of enablement of said dispensing means.

2. Beverage dispensing apparatus including in combination a reservoir adapted to receive a beverage to be dispensed, means for sensing the amount of said beverage in said reservoir, means responsive to user actuation for dispensing said beverage from said reservoir, means responsive to said sensing means for controlling the period of enablement of said dispensing means, means for heating the beverage contained in said reservoir, and means responsive to said sensing means for disabling said heating means.

3. Beverage dispensing apparatus including in combination a reservoir adapted to receive a beverage to be dispensed, means for sensing the amount of said beverage in said reservoir, means responsive to user actuation for dispensing said beverage from said reservoir, means responsive to said sensing means for controlling the period of enablement of said dispensing means, and means responsive to said sensing means for displaying the amount of said beverage in said reservoir.

4. Beverage dispensing apparatus including in combination a reservoir adapted to be filled to one of a plurality of ranges of levels with a beverage to be dispensed, means for supplying a predetermined amount of beverage to said reservoir, said ranges corresponding in extent to said predetermined amount, means for sensing the particular one of said ranges to which said reservoir is filled, and means responsive to said sensing means for displaying said sensed range.

5. Beverage dispensing apparatus including in combination a reservoir adapted to receive a beverage to be dispensed, sensing means for providing an output corresponding to the level of said beverage in said reservoir, means for dispensing said beverage from said reservoir, means for preselecting a desired amount of beverage to be dispensed, and means responsive to user actuation for enabling said dispensing means for a time interval determined in accordance with said preselected desired amount and the output of said sensing means.

6. Beverage dispensing apparatus including in combination a reservoir adapted to receive a beverage to be dispensed, a resilient beam positioned to support a portion of said reservoir at one end of said beam, a strain gauge adhered to a surface of said beam, means for dispensing said beverage from said reservoir, and means responsive to user actuation for enabling said dispensing means for a time interval determined in accordance with the output of said strain gauge.

7. Beverage dispensing apparatus including in combination a reservoir adapted to receive a beverage to be dispensed, a resilient beam positioned to support a portion of said reservoir at one end of said beam, said beam being relatively thin in the direction of bending under the weight of said reservoir, means for sensing strain in said beam, means for dispensing said beverage from said reservoir, and means responsive to user actuation for enabling said dispensing means for a time interval determined in accordance with said sensed strain.

8. Beverage dispensing apparatus including in combination a reservoir adapted to receive a beverage to be dispensed, a resilient beam positioned to support a portion of said reservoir at one end of said beam, means for sensing strain in said beam, means for dispensing said beverage from said reservoir, and means responsive to user actuation for enabling said dispensing means for a time interval determined in accordance with said sensed strain.

9. Beverage dispensing apparatus including in combination a reservoir adapted to receive a beverage to be dispensed, a resilient member positioned to support a portion of said reservoir, means for sensing strain in said member, means for dispensing said beverage from said reservoir, and means responsive to user actuation for enabling said dispensing means for a time interval determined in accordance with said sensed strain.

* * * * *